Oct. 10, 1967
B. R. NELSON
3,346,213
HOSE REEL ASSEMBLY
Filed Dec. 20, 1965
5 Sheets-Sheet 2
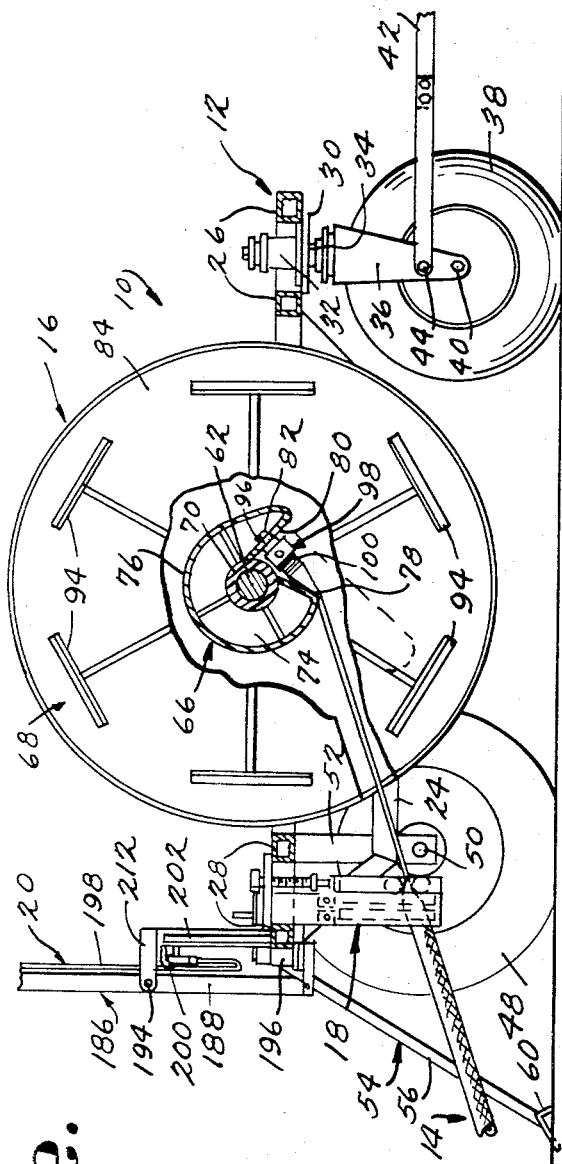
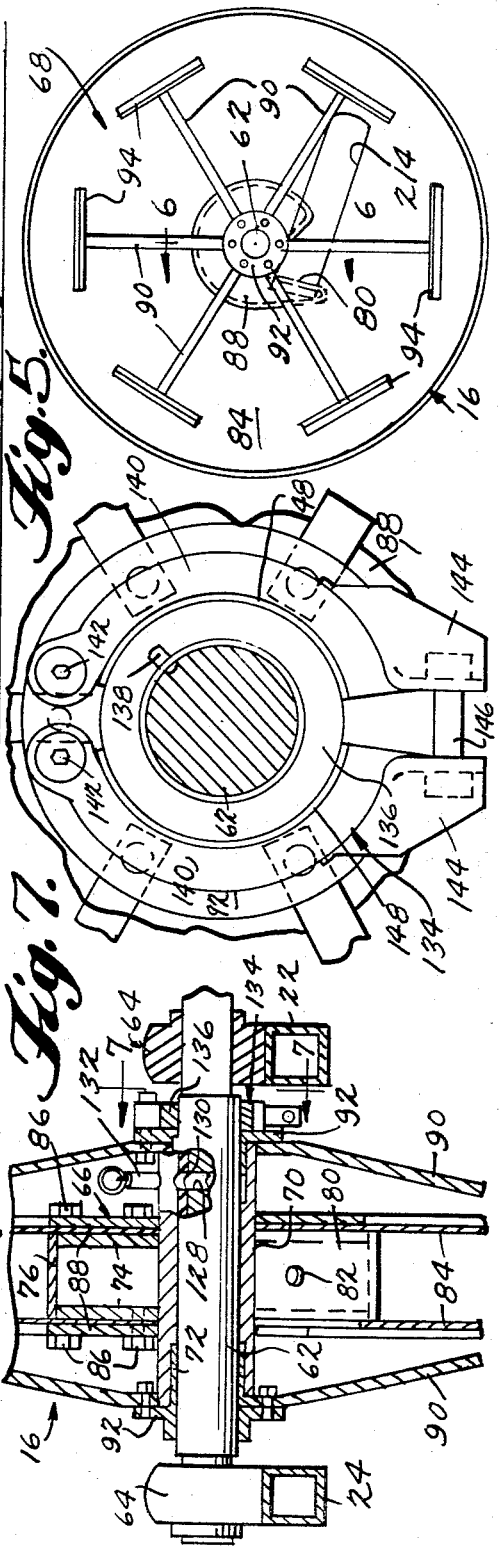

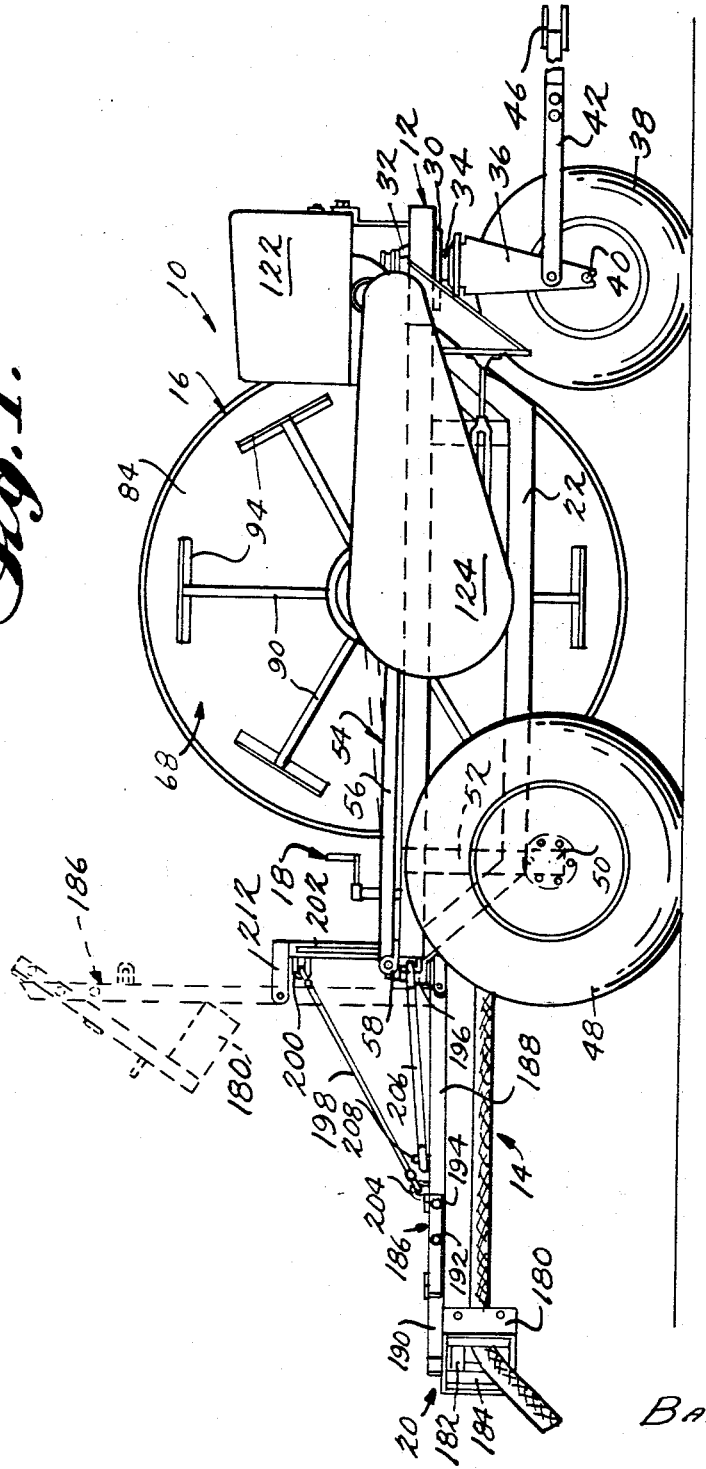

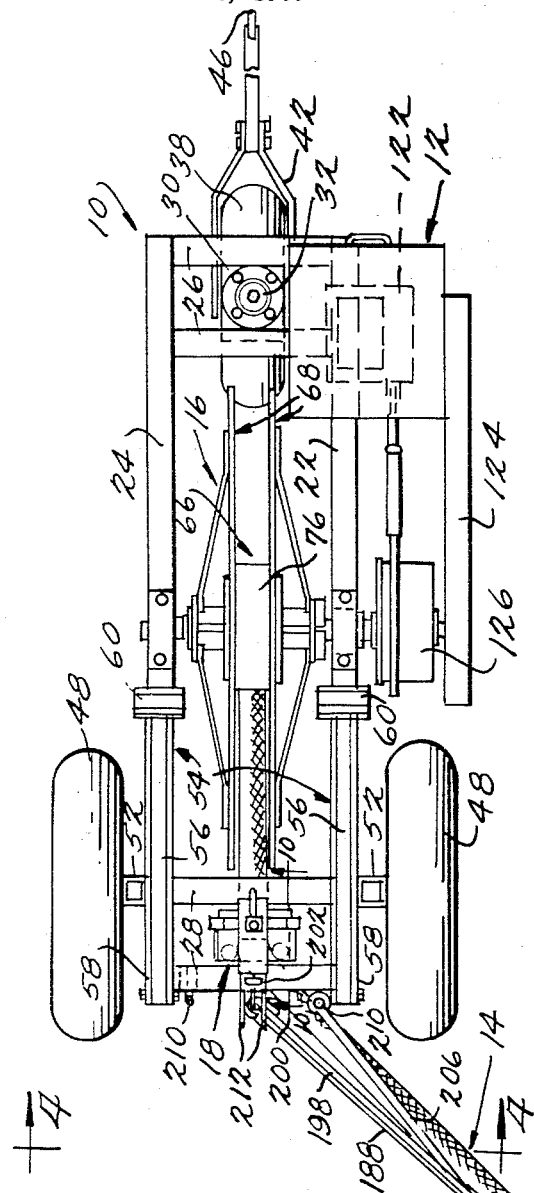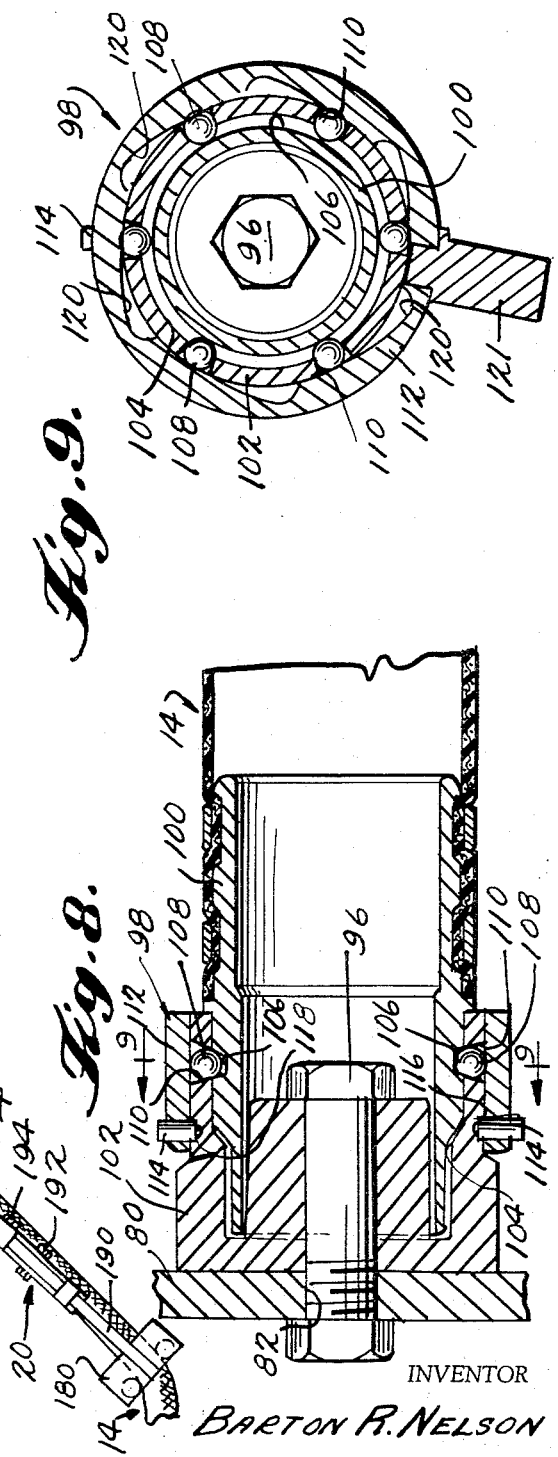

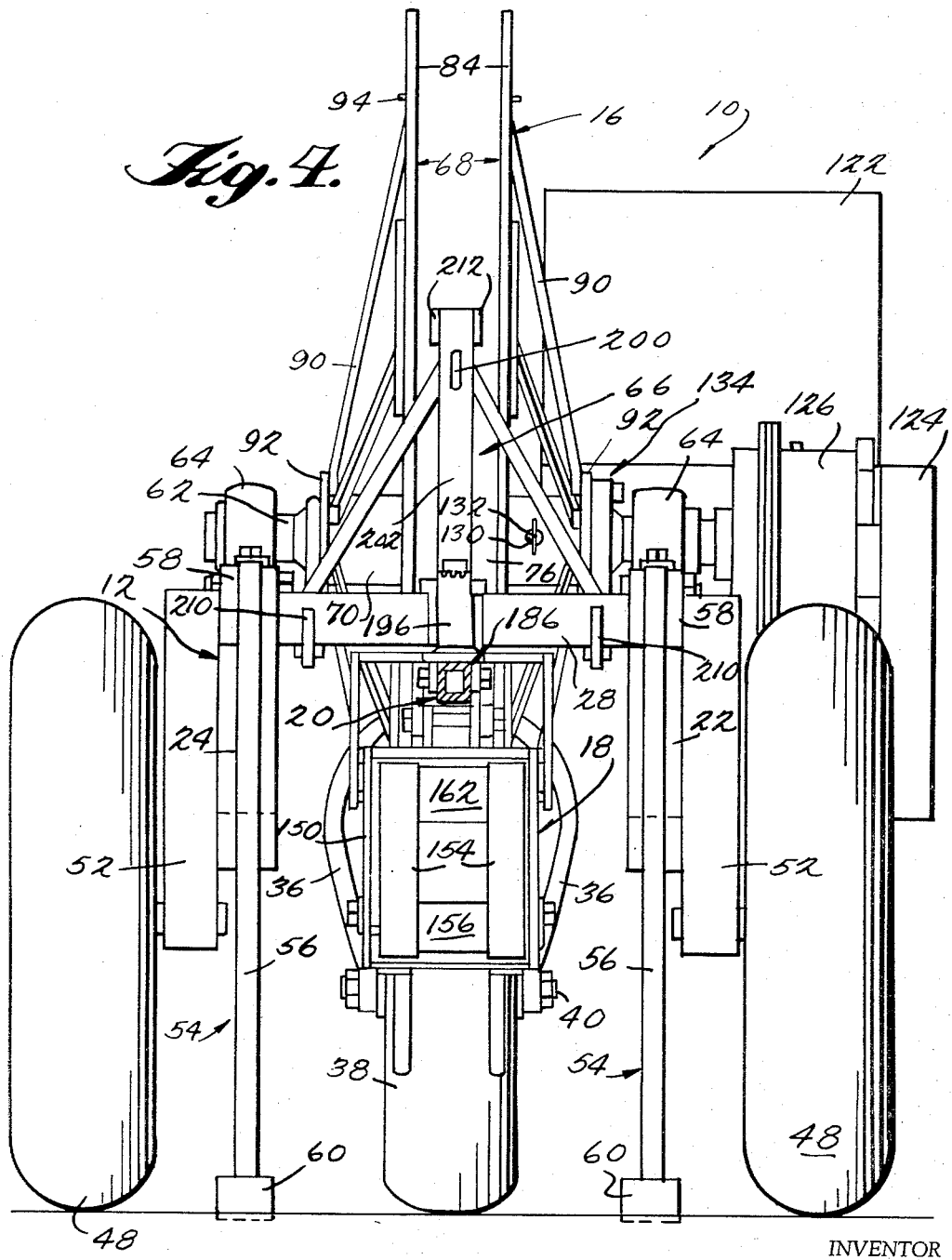

Oct. 10, 1967  B. R. NELSON  3,346,213
HOSE REEL ASSEMBLY
Filed Dec. 20, 1965  5 Sheets-Sheet 5

INVENTOR
BARTON R. NELSON
BY Cushman, Darby & Cushman
ATTORNEYS

United States Patent Office 3,346,213
Patented Oct. 10, 1967

3,346,213
HOSE REEL ASSEMBLY
Barton R. Nelson, Peoria, Ill., assignor to L. R. Nelson Mfg. Co., Inc., Peoria, Ill., a corporation of Illinois
Filed Dec. 20, 1965, Ser. No. 514,870
9 Claims. (Cl. 242—86.2)

This application constitutes a continuation-in-part of my copending application Serial No. 478,594, filed Aug. 10, 1956, and now abandoned.

This invention relates generally to irrigation of agricultural fields and more particularly to an improved apparatus for handling an extensive length of hose such as may be used in sprinkler irrigating agricultural fields or the like.

In my above-mentioned copending application, there is disclosed a springler irrigation apparatus embodying a self-propelled, furrow-guided springling vehicle which is operable to distribute water through a sprinkler head to an agricultural field during a continuous furrow-guided movement along the field to an extent of approximately 1200 feet. The apparatus of my copending application has included on the vehicle frame a reel assembly and other equipment for handling a hose of the order of 600 feet in length and 4 inches in diameter, preparatory to the sprinkling run and after the sprinkling run has been accomplished. The apparatus of my copending application is therefore fully self-contained and is quite suitable for most applications.

However, where excessively large acreage is to be irrigated, it may be desirable to provide more than one sprinkler apparatus in order to effectively irrigate the entire area. Since the hose handling equipment forming a part of the springler apparatus of my copending application is used only a fraction of the time during the entire cycle of operation, it is desirable where the acreage conditions are such as to require simultaneous sprinkling in a plurality of different areas to provide the hose handling equipment on a separate frame from the sprinkling equipment so that the hose handling equipment may be used separately in conjunction with a plurality of separate sprinkler devices. Thus, in those situations where the acreage is such as to require more than one sprinkling apparatus, the cost of the equipment required to effect the sprinkling operation can be reduced by eliminating the necessity of providing hose handling equipment on each sprinkler device. Moreover, by staggering the operating cycles of the plurality of sprinkler devices, a single separate hose handling device can be used to operate with the plurality of sprinkler devices at staggered times during the overall cycles of operation so that the entire operation can be completed without an increase in the time required.

Accordingly, it is an object of the present invention to provide a hose handling apparatus of the type described which is capable of effectively handling hose having a length as much as 600 feet or more with a diameter of 4 inches or more in a compact, transportable bundle free of contained water.

Still another object of the present invention is the provision of a hose handling apparatus of the type described having an improved reel mechanism for winding up the hose into a transportable bundle and for paying out the hose in a field to be irrigated.

Another object of the present invention is the provision of a hose handling apparatus of the type described having means for collapsing the hose as it is wound up on the reel mechanism so as to insure that contained water within the hose is expelled during the winding operation.

Still another object of the present invention is the provision of a hose handling apparatus of the type described having improved means for guiding the hose as it is unwound from the reel onto the field at a position spaced laterally from the reel.

Still another object of the present invention is the provision of a hose handling apparatus of the type described which is simple in construction, efficient in operation and economical to manufacture and maintain.

These and other objects of the present invention will become more apparent during the course of the following detailed description and appended claims.

The invention may best be understood with reference to the accompanying drawings wherein an illustrative embodiment is shown.

In the drawings:

FIGURE 1 is a side elevational view of a hose handling apparatus embodying the principles of the present invention illustrating the position of the parts during the positioning of the hose on the field;

FIGURE 2 is a view similar to FIGURE 1 with parts broken away for clearer illustration, showing the position of the parts during the initial hose winding operation;

FIGURE 3 is a top plan view of the apparatus as shown in FIGURE 1;

FIGURE 4 is a rear sectional view taken along the line 4—4 of FIGURE 3;

FIGURE 5 is a left side elevational view of the reel assembly;

FIGURE 6 is an enlarged fragmentary sectional view taken along the line 6—6 of FIGURE 5;

FIGURE 7 is an enlarged fragmentary sectional view taken along the line 7—7 of FIGURE 6;

FIGURE 8 is a fragmentary vertical sectional view of the hose fitting of the reel assembly;

FIGURE 9 is a sectional view taken along the line 9—9 of FIGURE 8;

Figure 11:
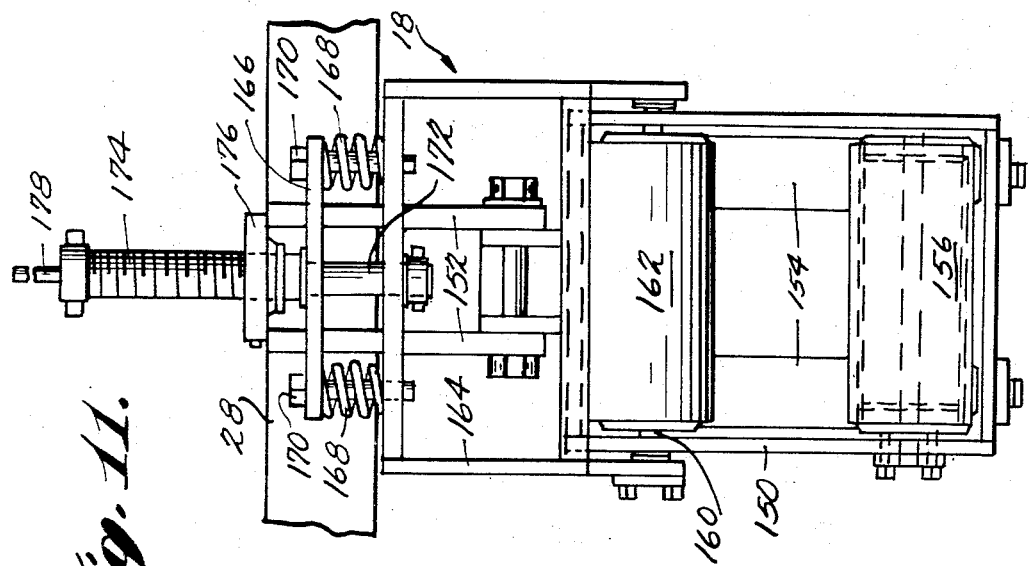
FIGURE 11 is a sectional view taken along the line 11—11 of FIGURE 10.

Referring now more particularly to FIGURES 1 through 4, there is shown therein an apparatus, generally indicated at 10 embodying the principles of the present invention. The apparatus includes a frame assembly, generally indicated at 12, which is supported for movement along a field within which sprinkler irrigation operations are to take place, so as to handle a length of hose, generally indicated at 14, which is adapted to communicate a source of water under pressure in the field (not shown) to a remotely operable sprinkling device (not shown).

The frame 12 carries a reel assembly, generally indicated at 16, capable of power driven rotation to wind up the hose 14 thereon in a compact, transportable bundle free of contained water after the sprinkling operation has been completed and capable of controlled rotation in the opposite direction to pay out the hose and position the same onto the field preparatory to the commencement of the sprinkling operation.

To insure that the hose is properly collapsed and exhausted of any contained water therein during the winding up operation of the reel assembly 16, a hose collapsing assembly, generally indicated at 18, is provided on the frame in spaced relation to the reel assembly 16. The hose collapsing assembly 18 may also be used to guide the hose as the latter is unwound from the reel assembly. To effect a laterally offset positioning of the hose with respect to the frame during the unwinding procedure where conditions warrant, there is provided a rear hose guide assembly, generally indicated at 20.

Frame assembly

The frame assembly 12 may be of any suitable construction and, as shown, is of a generally box-like structure formed of rigidly interconnected tubular members.

As shown, the frame includes a pair of horizontally spaced, longitudinally extending truss-like frame members 22 and 24, the forward ends of the members being rigidly interconnected by a pair of horizontally spaced cross members 26 and the rearward ends thereof being interconnected by a pair of horizontally spaced cross members 28. Fixedly secured between the central portion of the forward cross members 26 is a horizontal mounting plate 30 suitably apertured to have fixedly secured thereto a vertical bearing assembly 32. Journaled within the bearing assembly 32 is a vertical shaft 34 forming a portion of an inverted Y-shaped yoke. The yoke includes a pair of spaced, downwardly extending legs 36 between which a front steerable wheel 38 is journaled, as by a shaft 40, carried by the lower end portions of the legs 36.

Preferably, a draft tongue assembly, generally indicated at 42, extends forwardly of the front guide wheel 38 and has its rear end bifurcated and pivoted to the legs of the yoke, as indicated at 44. The forward end of the tongue assembly is provided with a conventional hitch clevis 46 for connecting the frame assembly 12 to the drawbar of a conventional tractor or the like (not shown). In this way, the draft tongue assembly 42 serves to not only transmit the pull of the tractor to the frame assembly 12, but to effect steering movements of the front steerable wheel 38 as well.

The rear end portion of the frame assembly 12 is supported by a pair of rear ground engaging wheels 48, each of which is rotatably mounted on a stub shaft 50 carried by the lower end of a vertically extending wheel mounting arm 52. As best shown in FIGURE 4, each mounting arm 52 is rigidly secured to the outer surface of the associated frame member, as by welding or the like.

The frame assembly 12 also includes brake means, generally indicated at 54, which is operable to selectively prevent rearward movement of the vehicle as when the reel assembly is actuated to wind up the hose 14. While the brake means 54 may be of the conventional type associated with the rear wheels, as shown, the brake means embodies a pair of brake arms which are pivoted at one end to the upper rearward portion of the frame members 22 and 24, as by brackets 58. The opposite ends of the arms are provided with ground engaging elements 60 which are adapted, when the arms are pivoted rearwardly and downwardly with respect to the frame members 22 and 24, to engage the ground and thus prevent rearward movement of the frame assembly, as shown in FIGURE 2.

Hose

In order to enjoy the benefits of the present invention most efficiently, it is preferable to utilize a specially constructed hose 14. When dealing with a hose of a length of approximately 600 feet and a diameter of approximately 4 inches, it will be appreciated that the problem of disposing such a length of noncollapsible hose into a transportable bundle is virtually an insurmountable task. The weight of the contained water along (approximately 3600 pounds) in such a length of hose would present problems of handling which would render the operation impractical. Consequently, the hose of the present invention must not only be flexible so that it can be wound up into a compact bundle for transportation, but it must also be collapsible so that during the winding operation substantially all of the water contained within the hose can be squeezed out. In order to most efficiently carry out this concept, the hose should be collapsible throughout its length, that is, it should be in one continuous length free from rigid noncollapsible couplings. Consequently, the hose should be capable of being repaired, in the event it is damaged, in such a way that the coupling of the repaired part is collapsible. The hose desirably should be smooth along its outer periphery so that it can be pulled along the ground relatively easily and, at the same time, be abrasive resistant. It should not mildew when, for example, it is wound up into its transportable bundle formation, and finally, it should be relatively inexpensive.

One embodiment of such a hose is preferably made from a length of woven material imbedded between a relatively thick inner layer and a relatively thin outer layer of a thermoplastic resin with the longitudinal marginal edges of the imbedded woven material heat sealed in overlapping relation. A seamless hose construction may also be utilized to good advantage in which the woven material is formed in sleeve formation about a preformed inner tubular layer and a subsequent outer layer is then applied over the woven material.

In a preferred embodiment the diameter of the hose when expanded is 3 inches or 4 inches and when collapsed in flat condition has a thickness of approximately 0.4 inch. The woven fabric used as reinforcing may be made of any suitable material, a preferred material being nylon. The thermoplastic material between which the woven material is embedded may be resin, rubber or the like.

Reel assembly

Referring now more particularly to FIGURES 5-7, it will be noted that the reel assembly 16 is mounted on a shaft 62 journaled on the vehicle frame 12, as by bearings 64 or the like, suitably secured to the upper central portion of the frame members 22 and 24. The reel assembly includes a central hub structure 66 and a pair of side structures 68 spaced apart a distance of the order of the width of the collapsed hose to receive the same therebetween.

The hub structure 66 includes an inner tubular member 70 having sleeve bearing elements 72 in the ends thereof which rotatably engage the shaft 62. Rigidly secured to the central portion of the tubular member 70 is a pair of axially spaced radially extending sector shaped plates 74 having an arcuate plate 76 fixedly secured across their peripheries. As shown in FIGURE 5, the plate 76 has an arcuate extent somewhat over 270°, and one end thereof is curved inwardly, as indicated at 78, to provide an initial hose engaging surface. The plate 76 has an opposite end portion 80 which is bent tangentially inwardly and has an aperture 82 formed in the center thereof.

The side structures 68 are each in the form of a rimmed disc-shaped plate 84 connected with the hub plates 74, as by a series of bolts 86 or the like extending therethrough and through outer reinforcing plates 88. The outer periphery of each side plate 84 is connected with the associated end of the tubular member 70 by a plurality of circumferentially spaced brace members 90, the inner ends of which are bolted or otherwise secured to an end disc member 92 which, in turn, is bolted or otherwise secured to the adjacent end of the tubular member 70. The outer end of each brace member is welded to the central portion of a transverse angle iron 94 which is, in turn, secured as by bolts or the like, to the outer periphery of the associated side plate 84.

Secured to the plate end portion 80, as by a bolt assembly 96, is a tubular fitting, generally indicated at 98, preferably of the quick disconnect type for detachably engaging and securing a cooperating hose fitting 100 on one end of the hose 14. The other end of the hose 14 is likewise provided with a hose fitting (not shown) similar to the fitting 100 and engageable with a cooperating quick disconnect fitting (not shown) at the water source.

As best shown in FIGURES 8 and 9 the tubular fitting 98 includes a main body 102 which is centrally apertured to receive the bolt assembly 96. Formed in the body is a recess 104 for receiving the outwardly extending end portion of the cooperating hose fitting 100.

The hose fitting 100 is engaged with the end of the hose 14 at its inner end portion in conventional fashion and includes a central portion of enlarged thickness having an annular groove 106 formed in the outer periphery thereof adapted to selectively receive the inner end portion of a series of balls 108 made of a hard material, such as steel or the like, mounted for radial movement within a series of circumferentially spaced frustoconical openings 110 communicating with the recess 104 of the tubular fitting body 102. The balls 108 are forced radially inwardly with respect to the annular groove 106 by a sleeve 112 disposed in surrounding relation to the adjacent end portion of the tubular fitting body 102 and mounted for limited rotational movement with respect thereto. To this end, the sleeve 112 is fitted with a pair of conventional spring pressed ball units 114 at diametrically opposed positions. The casing of each unit 114 extends inwardly of the sleeve 112 into an arcuate slot 116 of slightly less than 60° arcuate extent. The bottom surface of each slot upon which the ball of the associated unit 114 rolls is formed with recesses 118 at each end into which the balls of the units 114 extend to index the sleeve 112 in either limiting position.

As best shown in FIGURE 9, the inner periphery of the sleeve 112 is formed with a series of circumferentially spaced wedge surfaces 120 which, when rotatably engaged with the balls 108, force the latter to move radially inwardly with respect to the groove 106. The sleeve 112 is provided with a radially extending handle 121 for effecting the turning movement thereof. It will be understood that the ball and groove arrangement provide a quick disconnect coupling between the tubular fitting body 102 and the hose fitting 100 in a manner which is generally conventional.

Power operated means are provided for rotating the reel assembly 16 to wind up the hose 14. The power source is preferably in the form of an internal combustion engine 122 of conventional design of the type having a built-in clutch and actuating lever whereby the output shaft may be selectively rendered inoperable while the engine is running. As shown, internal combustion engine 122 is mounted on the forward portion of the vehicle frame 12 and is connected, as through a belt and pulley assembly 124 of conventional design to a speed reducing transmission unit, generally indicated at 126, also of conventional construction. The output shaft of the transmission unit is drivingly connected with the shaft 62 and means is provided for selectively drivingly engaging the shaft 62 with the reel assembly 16 so that the engine 122 will be effective to wind up the hose 14 on the reel and for disengaging the power means and providing the reel with a braking action so that the hose can be unwound or payed out from the reel in a controlled manner. While this selective operable means may take many forms, as shown, the shaft 62 is formed with a radial bore 128 which is adapted to register with a circular opening 130 formed in the member 70. The shaft 62 is selectively fixed to the reel assembly by inserting a pin 132 into registering opening 130 and bore 128 (see FIGURES 4 and 6).

When the pin 132 is removed, the reel assembly 16 is free to rotate on the shaft 62 under the control of an adjustable brake assembly, generally indicated at 134. As shown in FIGURE 7, the brake assembly 134 includes a central brake sleeve 136 suitably fixed to the shaft 62 adjacent one end of the disc member 92, as by a key 138 or the like. A pair of arcuate brake arms 140 are pivotally mounted at one of their ends to the adjacent disc member 92, as indicated at 142, and the opposite ends thereof are provided with generally radially extending spaced lugs 144 interconnected by a bolt assembly 146. The inner arcuate surfaces of the brake arms 140 are provided with arcuate brake liners 148 which are adapted to engage the peripheral surface of the brake sleeve 136. It will be understood that by adjusting the bolt assembly 146, the brake assembly 134 may be adjusted to control the frictional engagement between the reel assembly 16 and the shaft 62.

*Hose collapsing assembly*

Figure 10:
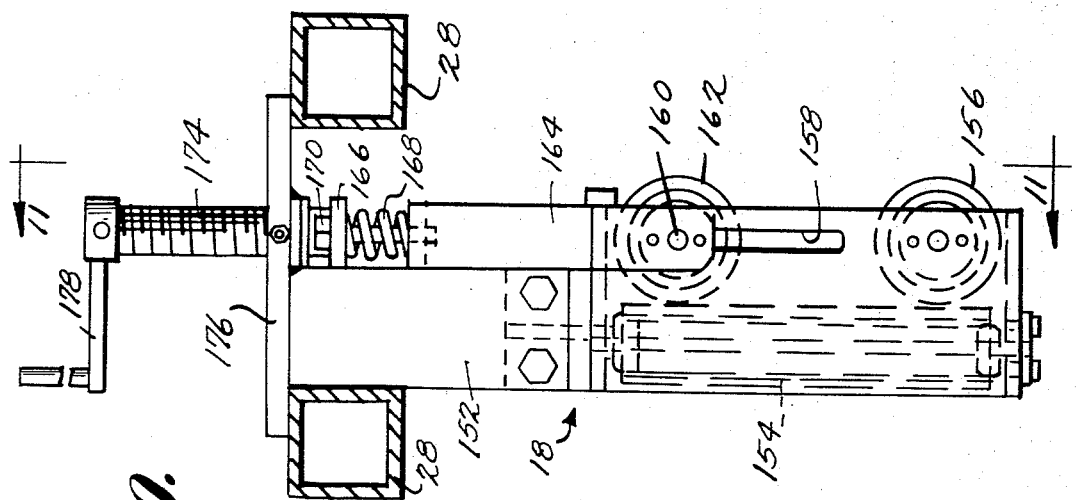
FIGURE 10 is a sectional view taken along the line 10—10 of FIGURE 3.

Referring more particularly to FIGURES 10 and 11, the hose collapsing assembly 18 preferably comprises a rigid rectangular frame 150 which is fixedly mounted at the rear of the vehicle frame 12 in a position below the rear cross members 28 as by a bracket 152. Journaled in the rearward portion of the rectangular frame 150 is a pair of upright rollers 154 spaced apart a distance of the order of the collapsed diameter of the hose 14. A lower horizontal roller 156 is rotatably mounted between the sides of the rectangular frame forwardly of the vertical rollers 154. Formed in the sides of the frame 150 above the roller 156 is a pair of vertical slots 158 within which the end portions of a shaft 160 are slidably mounted. An upper roller 162 is journaled on the shaft 160 between the sides of the frame 150 and the ends of the shaft extend outwardly of the sides of the frame 150 and are journaled in the lower ends of the legs of an inverted U-shaped yoke-like member 164.

Disposed above the bight portion of the U-shaped member 164 is a horizontal bar 166 having a coil spring 168 connected between each end thereof and the adjacent bight portion of the U-shaped member 164. Preferably, a stud 170 extends through each end of the plate 166 and the associated coil spring 168 and is threadedly engaged in the adjacent bight portion of the U-shaped member 164. The studs 170 serve as guide members which permit the U-shaped member carrying roller 162 to be moved upwardly with respect to the bar 166. The central portion of the bar 166 and the central bight portion of the U-shaped member 164 are provided with aligned apertures for receiving a lower stem portion 172 of an adjusting rod having an upper portion 174 which is threaded and engaged within a bracket 176 fixed to the cross-members 28. The upper end of the adjustment rod portion 174 is provided with an acuating handle 178.

It will be seen that by turning the handle 178, the actuating rod will be moved vertically with respect to the bracket 176, which in turn, will cause a vertical movement of the roller 162, U-shaped member 164 and plate 166 with respect to the roller frame 150. In this way, the upper roller 162 is moved between an open position spaced apart from the lower roller a distance of the order of the collapsed diameter of the hose 14 and a lower collapsing position adjacent the lower roller 156. When the upper roller 162 is in the latter position, it will be noted that the spring connection between the U-shaped member 164 and the bar 166 will permit the upper roller 162 to be biased upwardly in the event that an obstruction in the hose is encountered.

*Rear hose guide assembly*

The pivoted rear hose guide assembly 20 includes a rectangular frame 180 having a pair of vertically spaced horizontally extending rollers 182 and a pair of horizontally spaced vertically extending rollers 184 journaled therein, similar to the assembly 18. However, this assembly is mounted for movement into two different lateral operative positions and into a raised transport position. To this end, the frame 180 is fixedly secured to the rear end of a mounting arm assembly 186 made up of two arm sections 188 and 190 pivotally connected together, as indicated at 192 and provided with registering apertures for receiving a pin 194 which, when engaged in the apertures, serves to retain the arm sections in rigid alignment and, when removed, permit the arm sections to pivot with respect to each other.

The forward end of the forward arm section 188 is connected to the central portion of the rear vehicle frame member 28, as by a universal joint 196 providing for horizontal swinging movement about a vertical axis and vertical swinging movement about a horizontal axis.

The mounting arm assembly 186 is thus swingable horizontally into either one of two operative positions wherein the hose guide assembly is disposed laterally outwardly of the sides as shown in FIGURE 3 and is retained therein by a flexible member 198, such as wire rope or the like. One end of the flexible member is connected to an eye bolt 200 carried by a standard 202 rigidly fixed to the rear cross member 28 and extending upwardly therefrom. The flexible member 198 is connected to the eye bolt 200 in alignment with the vertical pivotal axis of the universal joint 196 and its opposite end is connected to an eye bolt 204 secured to the rearward end portion of the forward arm section 188. The flexible member 198 thus serves to limit the downward vertical swinging movement of the mounting arm assembly with respect to the frame to a horizontal position but permits a horizontal swinging movement thereof as well as an upper vertical swinging movement thereof. The rearward end of the mounting arm assembly 186 is pivotally connected to the rearward end of a guide rod 206, as by pin 208 carried by the rearward portion of the forward arm section 188. The forward end of the guide rod 206 is selectively pivotally connected to one of a pair of pins 210 fixedly secured to the sides of the rear frame member 28 to selectively fixedly retain the roller assembly in either of its lateral operative positions.

The roller assembly is retained in its transport position by removing the pin 194 from its position of connection between the arm sections and inserting the pin between the apertured rear ends of a pair of bracket plates 212 extending rearwardly from the upper end portion of the standard 202 after having pivoted the forward arm section upwardly until the pin receiving aperature thereof is aligned with the aperatures of the bracket plates.

Operation

The apparatus 10 of the present invention can be used for many different hose handling situations such as transporting hose used as main line to serve stock watering or the like. Preferably, it is used in conjunction with traveling sprinklers in which the hose 14 is used as conduit for conveying water under pressure from a source to the sprinkler itself. For example, in my above-mentioned copending application there is shown a self-propelled, furrow-guided sprinkler apparatus which is operable to water an area in an agricultural field having a length of approximately 1200 feet when used in conjunction with a hose, such as the hose 14 of the present invention having a length of approximately 600 feet. The particular sprinkling apparatus disclosed in the aforesaid copending application commences its sprinkling operation at a position spaced approximately 600 feet from the source with the hose extending in parallel relation to a guide furrow defining the path of movement of the apparatus. After the apparatus has completed its operative run, the hose extends between the source and the sprinkler head within the guide furrow.

While the apparatus of my copending application is provided with hose handling means to initially position the hose in the field prior to the commencement of the operative run and to collapse and wind up the hose into a transportable bundle free of contained water after the operative run, where such equipment is not provided in the apparatus itself, the present apparatus may be advantageously used to perform the aforesaid hose handling operations at the beginning and end of the operative run. For convenience in description, the cycle of operation of the present apparatus will be described beginning with the hose 14 disposed in the field with water contained therein, the associated sprinkler apparatus having just completed its operative run.

First, the apparatus is towed into the field as by a tractor or the like and stopped over one end of the hose, either at the source or at the sprinkler apparatus. The reel assembly 16 should be kept in a relatively straight line with the hose; thus, keeping the pull of the hose to the rear of the frame. Next, the reel assembly is rotated by hand until the opening 130 in the reel hub sleeve 70 lines up with the bore 128 in the reel shaft 62. The reel locking pin 132 is then inserted into the registering opening and bore locking the reel and shaft together. Then the operator places the hose through the hose collapsing assembly 18 and connects the fitting 100 to the reel fitting 98, through the operation of quick disconnect handle 121. In this regard, the reel disk 84 on the side of the apparatus opposite the motor 122 is provided with an access opening 214 (see FIGURE 5), through which the coupling of the two fittings can be manually accomplished and the handle 121 actuated.

Next, the handle 178 of the assembly 18 is turned to lower the upper roller 162 into the hose collapsing position. In some instances, due to differences in elevation, the water in the hose may run out by gravity, but the hose collapsing assembly 18 should be used to insure that all the water is removed as the hose is wound onto the reel. Then the reverse stop brake means 54 on the back of the frame are lowered to act as a brake to hold the frame from rolling backward as the hose is reeled up. The brakes on the tractor could also be used for this purpose. After a brake has been established, the engine 122 is started and engaged to commence winding the hose onto the reel.

In response to the initial turning action, the arcuate surface 78 provided by the hub structure 66 will engage the portion of the hose 14 adjacent the fitting 100. As best shown in FIGURE 2, the reel fitting 98 is carried by the hub structure in a position wherein the axis of the fitting body 102 is generally tangential to the arcuate surface 78. It will be noted that this relationship insures that the subsequent turning action of the reel will transmit the force of the reel to the hose through the reel fitting 98 and the hose fitting 100 in such a manner that the pull between the hose fitting 100 and hose 14 is generally uniform.

It will also be understood that continued rotational movement of the reel assembly under the action of the engine 122 will serve to wind the hose 14 onto the reel assembly 16 in a single roll, the side structures 68 being spaced apart a distance of the order of the width of the collapsed hose to insure that each successive winding of the hose will be upon the succeeding winding. It will also be understood that the initial loop of the roll will engage the hose engaging surface of the hub structure arcuate plate 76 as well as the hose engaging surface 78. When the entire hose 16 has been wound up on the reel, the motor 122 is disengaged and the apparatus 10 can then be transported to a new position of use, as for example, an orchard, after having moved the brake arms into their inoperative positions.

In the orchard the rear hose guide assembly 20 is lowered from its transport position and located to the side of the machine as shown in FIGURE 3. Then the exposed end of the hose, which is hanging from the collapsing assembly 18, is fed through the hose guide and connected to the water supply or another suitable anchor.

In an orchard where the hose must be placed to the side of the lane between the trees, it will be necessary to use the assembly 20 to place the hose to the side of the frame and reel underneath the branches of the trees where it would have been impossible to lay it if it were paid out in a straight line directly from the rear of the frame. On the other hand, if the hose is to be placed across an open field, it may be paid directly from the reel through the assembly 18 to the ground.

Next, the handle 178 of the assembly 18 is turned to raise the upper roller into an open position, and the reel locking pin 132 is removed from the reel hub and reel shaft. Thus, the reel is allowed to have free rotation except for the drag of the friction brake 134. The controlled rotation of the reel assembly 16 by the brake assembly 134 is important for the reason that if the reel assembly were permitted to have free rotational movement and during the pay out travel of the apparatus it became necessary for the tractor operator to stop, the reel would continue to rotate and pay out a good portion of the hose in a haphazard condition on the portion of the field where the apparatus was stopped. Finally, the handle 121 of the fitting 98 actuates to move the balls into a release open position, and the operator can drive away. As the apparatus moves ahead and reaches the end of the hose, the hose will drop off without having to stop. The cycle of operation of the machine is thus completed.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed with the spirit and scope of the following claims.

What is claimed is:

1. Apparatus of the type described comprising a length of hose of an extent and diameter size sufficient for use in agricultural field irrigation, said hose being flexible and collapsible when free of water into a substantially flat condition, a rigid annular hose fitting on each end of said hose, a frame adapted to be moved along an agricultural field, a reel mounted on said frame for movement about an axis of rotation, said reel including a hub structure and a pair of annular side structures extending radially outwardly of said hub structure, said side structures being spaced apart axially a distance of the order of the width of said collapsed hose, a power driven shaft carried by said frame for power driven rotation in one direction, means for selectively drivingly connecting said reel with said power driven shaft to rotate said reel in one direction about its axis and for permitting a braked rotational movement of said reel in the opposite direction about its axis, a rigid annular cooperating fitting fixedly secured to the hub structure of said reel for detachable engagement with one of said hose fittings in secured relation thereto, said annular cooperating fitting having an axis fixed with respect to said reel and extending in perpendicular spaced relation to the axis of rotation of said reel, said hub structure providing an arcuate surface extending generally tangentially to the axis of said cooperating fitting and to the axis of said one hose fitting when secured thereto for engaging a portion of said hose adjacent said one hose fitting in response to an initial rotational movement of said reel in said one direction so that the tensile forces in said hose are transmitted to said one hose fitting generally uniformly, and surface means disposed in an annular plane surrounding the axis of said reel, said arcuate surface and said cooperating fitting for engaging the next adjacent portion of said hose in response to continued rotational movement of said reel in said one direction so as to form an inner loop in the next adjacent portion of said hose upon which the remainder of said hose is subsequently wound into a single roll in response to continued rotational movement of said reel in said one direction, and means carried by said frame in spaced relation to said reel for progressively collapsing said hose into a flat condition to expel any water contained therein as the latter is wound on said reel.

2. Apparatus as defined in claim 1 wherein said cooperating fitting includes means for releasing the securement of said one hose fitting while said hose is wound on said reel in said single roll so that when said hose is payed out from said reel said one hose fitting will releasably disengage said cooperating fitting.

3. Apparatus as defined in claim 1 wherein said reel rotation selective means comprises a reel shaft journaled on said frame and drivingly connected with said power driven shaft, said reel hub structure being rotatably mounted on said reel shaft, an adjustable friction brake connected between said reel and said reel shaft so as to permit said braked rotational movement of said reel with respect to said reel shaft and disengageable means engageable between said reel and said reel shaft for positively fixedly securing said reel for rotation with said reel shaft.

4. Apparatus as defined in claim 1 including a clutch operated internal combustion engine mounted on said frame, and transmission means drivingly connecting said power driven shaft with said internal combustion engine.

5. Apparatus as defined in claim 4 wherein said frame includes axle means carried by said frame having an axis disposed in rearwardly spaced parallel relation to the axis of rotation of said reel, a pair of rear ground engaging wheels carried by said axle means for independent rotational movement with respect to each other, and front steerable wheel means carried by said frame adjacent the forward end thereof.

6. Apparatus as defined in claim 5 including brake means carried by said frame for selectively preventing rearward movement of said frame.

7. Apparatus as defined in claim 6 wherein said brake means comprises brake arm means pivoted at one end portion to said frame and having an opposite end adapted to engage the ground at a position rearwardly of the pivotal connection with said frame.

8. Apparatus as defined in claim 5 wherein said front steerable means comprises an inverted Y-shaped yoke member journaled on said frame for pivotal movement about a central vertical axis, a front wheel carried by said yoke for pivotal movement therewith and for rotation about a horizontal axis, and a draft tongue having its rear end pivoted to said yoke for vertical swinging movement.

9. Apparatus as defined in claim 1 wherein the axis of said reel extends horizontally from side to side of said frame, said hose collapsing means being disposed in the central portion of said frame in spaced alignment with the side structures of said reel, and means for receiving and guide said hose as the latter is payed out from said reel so as to progressively position the paid out hose in either one of two positions outwardly of oppsite sides of said frame.

References Cited

UNITED STATES PATENTS

| 1,417,459 | 5/1922 | Cox | 137—355.26 |
| 1,915,632 | 6/1933 | Marks | 242—86 |
| 2,518,990 | 8/1950 | Keener | 242—86.2 X |
| 2,570,573 | 10/1951 | Liboiron | 242—86.2 X |
| 2,918,975 | 12/1959 | Conery et al. | 242—86.2 X |
| 3,000,587 | 9/1961 | Goode | 242—86.5 |

FRANK J. COHEN, *Primary Examiner.*

W. S. BURDEN, *Assistant Examiner.*